(12) United States Patent
Behr et al.

(10) Patent No.: US 6,470,350 B1
(45) Date of Patent: Oct. 22, 2002

(54) METHOD AND SYSTEM FOR SIMULATING A DATABASE TABLE IN RESPONSE TO A DATABASE QUERY

(75) Inventors: Gail L. Behr, Minneapolis; Michael F. Parenteau; Stephen C. Payne, both of Roseville, all of MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/461,253

(22) Filed: Dec. 15, 1999

(51) Int. Cl.[7] .............................. G06F 7/00; G06F 17/00
(52) U.S. Cl. .............................. 707/102; 707/2; 707/3; 709/101; 709/104
(58) Field of Search .............................. 707/1, 2, 3, 4, 707/5, 100, 101, 102, 103, 201, 204, 10; 709/101

(56) References Cited

U.S. PATENT DOCUMENTS

| | | | | |
|---|---|---|---|---|
| 5,261,093 A | * | 11/1993 | Asmuth | 395/12 |
| 5,546,570 A | * | 8/1996 | McPherson, Jr. et al. | 364/282.1 |
| 5,737,591 A | * | 4/1998 | Kaplan et al. | 395/602 |
| 5,758,355 A | * | 5/1998 | Buchanan | 707/201 |
| 5,873,086 A | * | 2/1999 | Fujii et al. | 707/10 |
| 5,903,887 A | * | 5/1999 | Kleewein et al. | 707/2 |
| 6,253,200 B1 | * | 6/2001 | Smedley et al. | 707/4 |

* cited by examiner

*Primary Examiner*—Sam Rimell
*Assistant Examiner*—Jacques Veillard
(74) *Attorney, Agent, or Firm*—Charles A. Johnson; Mark T. Starr; Crawford, PLLC

(57) ABSTRACT

A method and system for providing access to data stored in a plurality of data sets. A simulated table definition is hosted by a server and includes selected data definitions from the plurality of tables. Data extraction logic is hosted by the server and extracts data from the plurality of tables into memory of the server consistent with the simulated table definition and responsive to a request for access to the simulated table. Interface logic is also hosted by the server and is coupled to the data extraction logic. The interface logic transmits the extracted data to the requester consistent with the simulated table and returns for reuse the memory occupied by data of the simulated table after transmitting the data.

19 Claims, 3 Drawing Sheets

METHOD AND SYSTEM FOR SIMULATING A DATABASE TABLE IN RESPONSE TO A DATABASE QUERY

FIELD OF THE INVENTION

The present invention generally relates to database management systems, and more particularly to providing access to data stored in a plurality of tables using a standardized query. In specific embodiments, access is provided to data stored in a plurality of tables and/or generated by a plurality of programs, Mapper runs, or any program capable of being invoked by a Mapper run.

BACKGROUND OF THE INVENTION

SQL is an industry standard language that is used to reference relational database tables. Open Database Connectivity (ODBC) is the protocol that uses the SQL to provide access to database tables hosted on a server by a database management system. ODBC interfaces have been developed in various systems for data hosted by a fourth-generation language (4GL) such as Mapper from Unisys.

With Mapper applications, as well as other applications which were developed prior to the proliferation of ODBC interfaces, a single table can be generated from multiple systems, each hosting a portion of the requested data. Thus, a table can be generated from a combination of local and remote database access. For example, if there are four regional databases, a Mapper run (program) could generate a single table containing data from the four databases and/or applications. However, introducing an ODBC interface presents additional considerations of the same data set is desired.

With an ODBC interface to the four regional databases, access to the data set can be provided using at least two approaches. In one approach, the data set from the multiple tables could be gathered using multiple SELECT commands. However, if the data relations are complex and there is a wide variety of data to be gathered, the SELECT commands may be complex, thereby increasing the chance of error in formulating the SELECT commands.

In another approach for assembling the data set using multiple databases, the data set could be defined as a separate relational table, in addition to the multiple database tables. This approach would result in redundant data, however, and require application development time.

A system and method that addresses the aforementioned problems, as well as other related problems, is therefore desirable.

SUMMARY OF THE INVENTION

In various embodiments, systems and methods provide access to data stored in a plurality of data sets. A simulated table definition is hosted by a server and includes selected data definitions from the plurality of tables. Data extraction logic is hosted by the server and extracts data from the plurality of tables into memory of the server consistent with the simulated table definition and responsive to a request for access to the simulated table. Interface logic is also hosted by the server and is coupled to the data extraction logic. The interface logic transmits the extracted data to the requester consistent with the simulated table and returns for reuse the memory occupied by data of the simulated table after transmitting the data.

In accordance with another embodiment of the invention, there is provided a computer program product that is configured to be operable to provide access to data stored in a plurality of data sets using a simulated table.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

Figure 1:
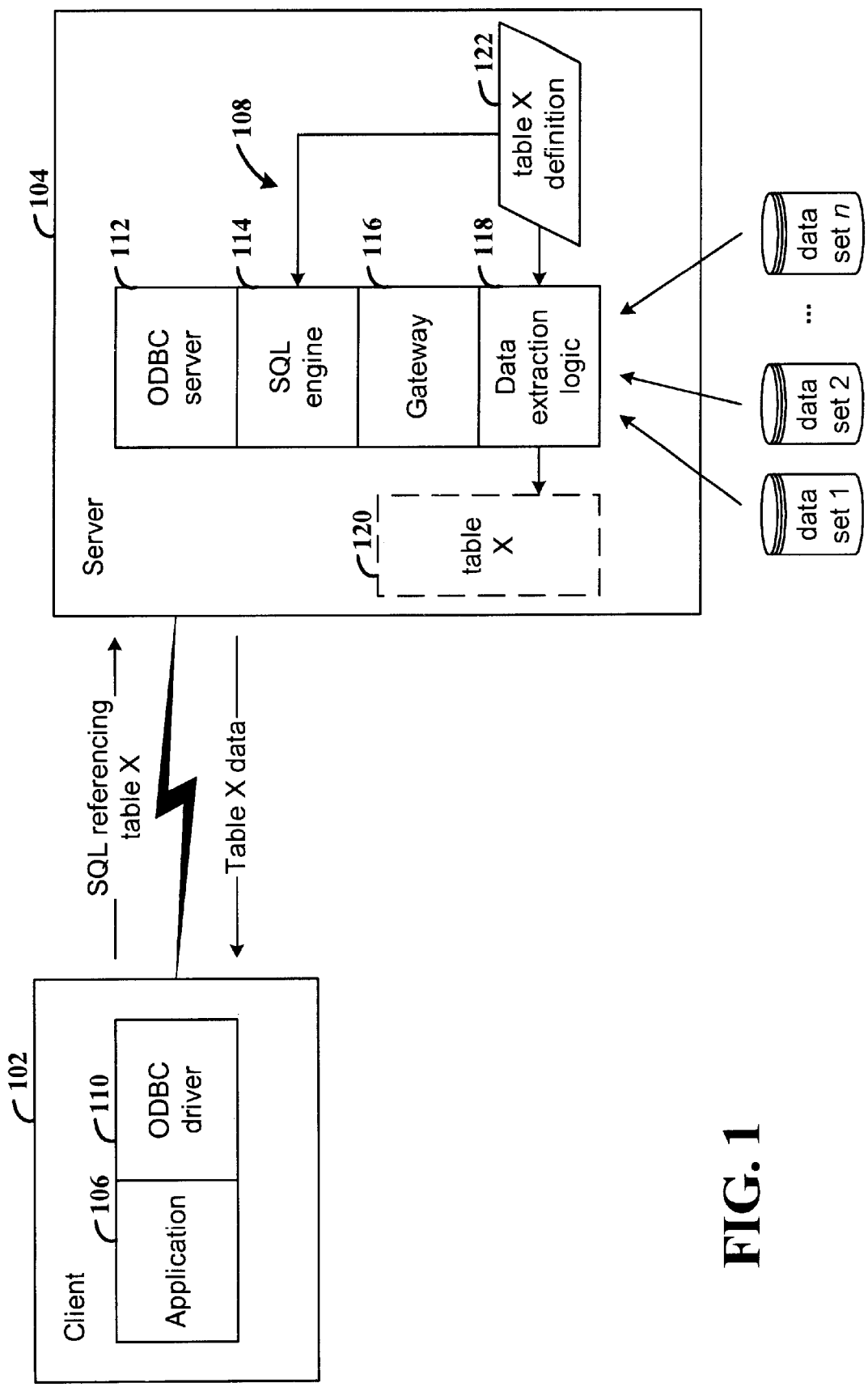
FIG. 1 is a functional block diagram of a system for simulating a database table in a client-server system in accordance with one embodiment of the invention.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. on the contrary, the intention is to cover all modifications, equivalents, and alternatives falling within the spirit and scope of the invention as defined by the appended claims.

DETAILED DESCRIPTION

FIG. 1 is a functional block diagram of a system for simulating a database table in a client-server system in accordance with one embodiment of the invention. The present invention provides the capability to present application 106 with data from data sets 1–n in the form of a relational table 120, even though there is no single persistent storage dedicated to the table. The system includes client data processing system (client) 102 and server data processing system (server) 104 that are coupled via a communication channel such as a local or wide area network. The particular hardware configurations and computing capabilities of the client and server depend upon the requirements of application 106 and database management system 108.

Application 106 is interfaced with ODBC driver 110, which interfaces with ODBC server 112. ODBC server 112 is hosted by server 104. ODBC driver 110 and ODBC server 112 are recognized by those skilled in the art as interface software developed by various database software vendors to support SQL queries. For example, ODBC driver 100 can be implemented using the TransIT ODBC software from Unisys. ODBC server 112 sends queries received from client 102 to SQL engine 114 and extracts data (or an error code) from output of the underlying data extraction logic 118 to return to client 102.

SQL engine 114 underlies ODBC server 112 and handles the dialog with the ODBC server. SQL engine 114 parses the query and determines which functions are performed in data extraction logic 118 (Mapper, for example) and which functions it will perform. The query that is passed to data extraction logic 118 is generated by the SQL engine in a form that is dependent upon the specific requirements of the data extraction logic. For example, the entire SQL query or a portion thereof may be passed to the data extraction logic.

Gateway logic 116 initiates the data extraction logic, transferring the query provided by the SQL engine 114. The specific implementation of gateway logic 116 is dependent on the requirements of data extraction logic 118. Data extraction logic 118 is application software that is implemented in combination with a particular software operating environment, for example an application operating in conjunction with the Mapper system from Unisys. The particular data manipulated by application logic depends on user requirements.

Data extraction logic is configured to manipulate one or more sets of data, shown as data sets 1–n. Data sets 1–n can be similar relational database tables or disjoint data sets, depending on application requirements. In addition, data sets 1–n can be stored locally relative to server 104 or remotely in nodes of a network.

The present invention provides the capability to present application 106 with data from data sets 1–n in the form of a relational table 120, even though there is no single persistent storage dedicated to the table. Data extraction logic 118, in response to a reference to table X as submitted in an SQL query from application 106, looks to a data dictionary to find a table X definition 122. Based on the definition of table X, data is read from data sets 1–n and assembled consistent with table X definition. Table X is stored in memory (not shown) of server 104 and returned to application 106 via software layers 116, 114, and 112 and the communications channel. It will be appreciated that table X exists in server 104 only while the query is in process. Once the data comprising table X is returned to client 102, the memory allocated to table X is reclaimed for other uses. Thus, table is simulated on server 104, and the data comprising table X persists in data sets 1–n.

The following example illustrates a simulated relational database table in accordance with the invention. Consider four data sets that track sales of color televisions, each data set associated with a region (north, south, east, and west) of the country and including different television models and associated numbers of units sold. Note that the regional data sets may include a vast assortment of additional data, which may or may not be useful from a national perspective.

To generate a report of nationwide television sales for the various models of televisions, the user of application 106 can submit a query, SELECT*FROM "nationwide color TV", and receive a table containing data of television sales accumulated from the four regional data sets.

To achieve the same results without the invention, an additional relational database table could be developed to contain the nationwide numbers of units sold for the various models of televisions. This would involve redundant data as the same data would be stored in the regional tables and in the nationwide table. In another approach, each of the regional databases could be accessed with separate SQL commands. For example, the command to view data from each of the regions would be (SELECT*FROM north region WHERE product="color TV", SELECT FROM south region WHERE product="color TV", SELECT*FROM east region WHERE product="color TV", SELECT*FROM west region WHERE product="color TV"). If the regional databases have a wide variety of data, the SELECT commands may become complex and error prone. The present invention allows users to view a table that is not persistently stored, which instead is generated from various data sets consistent with a definition of the table.

Figure 2:
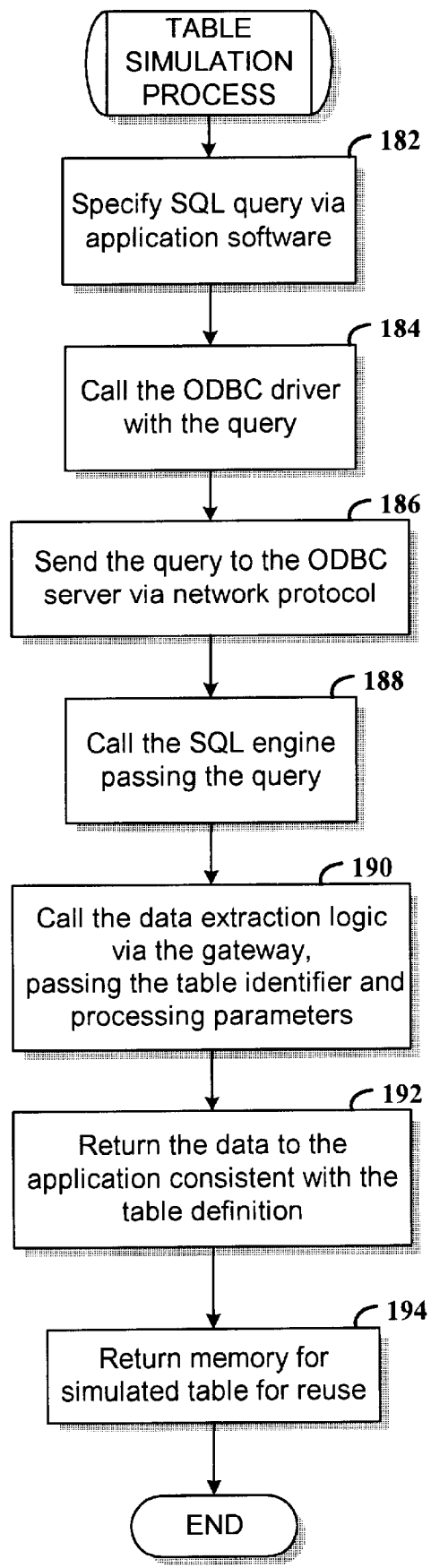
FIG. 2 is a flowchart of a process for simulating a database table in accordance with one embodiment of the invention.

FIG. 2 is a flowchart of a process for simulating a database table in accordance with one embodiment of the invention. The process generally entails transmitting an SQL query referencing a simulated table from a client application to a server, assembling data consistent with the definition of the simulated table, and returning the data to the client application.

At step 182 via a client application, an SQL query is specified that references the table to be simulated. The ODBC driver of the client system is called with the query at step 184, and the query is transmitted to the ODBC server via a network, for example, at step 186, which in turn passes the query to SQL engine 114.

SQL engine 114 parses the SQL query and obtains the referenced table name. The definition of the table (e.g., table X definition 122 of FIG. 1) is then used to determine whether the table is associated with a Mapper run, a Mapper report, or a Mapper span, for example. The run, report, or span is used to initiate the appropriate data extraction logic 118.

In one embodiment of the invention, SQL engine 114 is adapted to differentiate between conventional SQL WHERE clauses and a WHERE clause that is tailored specifically for use with passing parameters to a Mapper run associated with the simulated table. For conventional SQL WHERE clauses, the Mapper Query Language function is initiated to process the query. For the modified WHERE clauses, SQL engine 114 initiates the run associated with the simulated table and passes the parameters as specified in the WHERE clause. For example, a modified WHERE clause can be specified as:

WHERE '$runparam'='profit'

SQL engine 114 detects the $runparam character string and accordingly passes the character string profit to the data extraction logic. For example, if the run national$^{13}$reports is associated with the referenced table, the run will be initiated with:

National$^{13}$reports, profit

At step 190, the data extraction logic is called with the table identifier of the table to be simulated and any processing parameters included in the query. The data that is assembled by the data extraction logic is returned to the client application at step 192. Since the requested table is simulated, the memory occupied by the table can be reused for other purposes, as shown by step 194.

Figure 3:
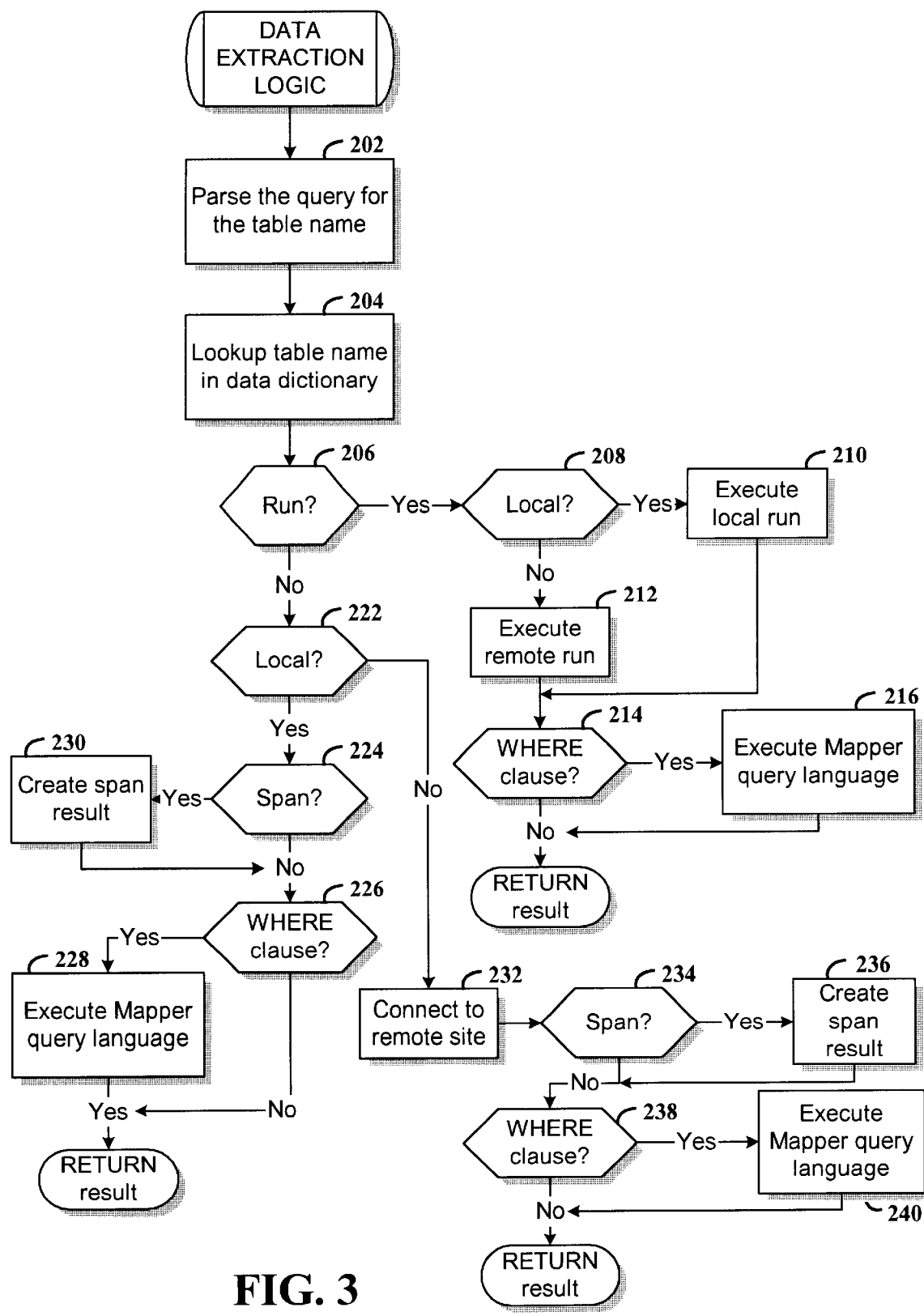
FIG. 3 is a flowchart of an example process for extracting data for the simulated table in response to an SQL query that references the table.

FIG. 3 is a flowchart of an example process for extracting data for the simulated table in response to an SQL query that references the table. The process generally entails obtaining the definition of the table to be simulated and gathering the data consistent with the table definition. The process addresses both local and remote storage of the data to be read.

At step 202, the table name is obtained from the SQL query, and the table name is looked up on a data dictionary at step 204. The data dictionary, describes the table to be simulated. Specifically, the data dictionary references a Mapper report containing the column information, the table name, the number of reports or spans encompassed by the simulated table, whether the table to be simulated is referenced as an executable program by the data extraction logic and the executable name if so, whether the table is read-only, the length of a data line, the column count, the location of (e.g., system and site) a remote executable, and a sign-on code for a remote system.

Decision step 206 tests whether a run is associated with the specified table, and if so, directs control to decision step 208. It will be appreciated that "run" refers to a program in the context of a Mapper system and that comparable programs could be used in combination with other data managers. The run associated with the simulated table is specifically programmed to read data from the necessary data sets and manipulate the data in accordance with the definition of the simulated table. For example, if nationwide sales totals for various models of televisions are to be generated from the regional databases, the run includes the logic to read the necessary data from the regional databases and sum the regional sales totals for the various models to arrive at the national sales totals.

If the run is a local run (relative to the server system), then control is directed to step 210 where the run is executed. Otherwise, control is directed to step 212 where the remote run is executed. Systems such as Mapper have the capability for remote execution of programs.

If the query has a WHERE clause, decision step 214 directs control to step 216, where the query is submitted for execution. Mapper, for example, has a function that is referred to as Mapper Query Language, which processes input SQL statements against a Mapper database.

After processing the query (with or without a WHERE clause), the remaining data is that requested in the original SQL query and is returned to the requesting client.

If there is no run associated with the simulated table, decision step 206 directs control to decision step 222. No run would be associated with the simulated table, for example, where the simulated table is a single Mapper report or a span of reports. Those familiar with Mapper will recognize that reports are maintained in persistent storage (e.g., disk storage). A Mapper run is used to construct a data set consistent with the referenced table when no report or span exists that is consistent with the table. Note that is "span" is a series of contiguous reports, wherein each report may be a table or a series together may be another table. A span resides on one system.

Decision step 222 tests whether the data referenced in the table definition is local or remote. For local data, control is directed to decision step 224 to test for a span. A span result is created at step 203. Consistent with conventional Mapper processing, the contiguous reports comprising the span are concatenated. If there is a WHERE clause (decision step 226), the query is submitted for processing at step 228, and the resulting data is then returned.

For non-local data, a connection is established to the remote site at step 232. The processing of steps 234, 236, 238, and 240 is performed at the remote site in a manner comparable to the processing of steps 224, 226, 228, and 230 as performed at the local site. While the process of FIG. 3 is described in terms of the data to be gathered for the simulated table being hosted either locally or remotely, it will be appreciated that a combination of both local and remote storage could be used to host the data.

Accordingly, the present invention provides, among other aspects, a system and method for simulating a database table in response to a database query. The invention has been described in terms of one embodiment in which remote SQL commands are processed by a Mapper system, and the table referenced in the SQL command is simulated. However, other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

We claim:

1. A computer-implemented method for providing access to data stored in a plurality of data sets, comprising:

establishing a simulated table definition including selected data definitions from the plurality of data sets;

extracting data from the plurality of data sets into computer memory consistent with the simulated table definition and responsive to a request for access to the simulated table;

transmitting the extracted data to the requester consistent with the simulated table; and returning for reuse the computer memory occupied by data of the simulated table after transmitting the data.

2. The method of claim 1, wherein the request is an SQL request including a reference to the simulated table.

3. The method of claim 2, further comprising:

associating data extraction logic with the simulated table definition; and initiating the data extraction logic in response to reference to the simulated table.

4. The method of claim 3, wherein the simulated table definition includes an identifier associated with the data extraction logic.

5. The method of claim 3, further comprising adapting execution of the data extraction logic in response to parameters specified in a WHERE clause of the SQL statement.

6. The method of claim 2, further comprising transmitting the SQL request from a client system to a server system.

7. The method of claim 6, wherein ODBC drivers are used in transmitting the SQL request from the client system to the server system.

8. The method of claims 7, wherein the SQL request includes a table identifier, and the simulated table definition includes the table identifier, further comprising providing the table identifier to the data extraction logic.

9. The method of claim 2, wherein the simulated table definition includes a reference to a predetermined Mapper report containing data consistent with the simulated table.

10. The method of claim 9, wherein the simulated table definition includes a system identifier referencing a data processing system on which the Mapper report is hosted.

11. The method of claim 2, wherein the simulated table definition includes a reference to one or more predetermined Mapper spans.

12. The method of claim 10, wherein the simulated table definition includes a system identifier referencing a data processing system on which the one or more Mapper spans are hosted.

13. An apparatus for providing access to data stored in a plurality of data sets, comprising:

means for establishing a simulated table definition including selected data definitions from the plurality of data sets;

means for extracting data from the plurality of data sets into computer memory consistent with the simulated table definition and responsive to a request for access to the simulated table;

means for transmitting the extracted data to the requester consistent with the simulated table; and means for returning for reuse the computer memory occupied by data of the simulated table after transmitting the data.

14. A system for providing access to data stored in a plurality of data sets, comprising:

a server data processing system;

a simulated table definition hosted by the server and including selected data definitions from the plurality of data sets;

data extraction logic hosted by the server, the data extraction logic configured and arranged to extract data from the plurality of data sets into memory of the server consistent with the simulated table definition and responsive to a request for access to the simulated table;

interface logic hosted by the server and coupled to the data extraction logic, the interface logic configured and arranged to transmit the extracted data to the requester consistent with the simulated table and return for reuse the memory occupied by data of the simulated table after transmitting the data.

15. The system of claim 14, wherein the request is an SQL request including a reference to the simulated table.

16. The system of claim 15, wherein the simulated table definition includes a reference to a predetermined Mapper report containing data consistent with the simulated table.

17. The system of claim 16, wherein the simulated table definition includes a system identifier referencing a data processing system on which the Mapper report is hosted.

18. The system of claim 15, wherein the simulated table definition includes a reference to one or more predetermined Mapper spans.

19. The system of claim 18, wherein the simulated table definition includes a system identifier referencing a data processing system on which the one or more Mapper spans are hosted.

* * * * *